United States Patent
McCaffrey et al.

(10) Patent No.: US 11,697,994 B2
(45) Date of Patent: Jul. 11, 2023

(54) CMC COMPONENT WITH COOLING PROTECTION

(71) Applicant: United Technologies Corporation, Farmington, CT (US)

(72) Inventors: Michael G. McCaffrey, Windsor, CT (US); Bryan P. Dube, Columbia, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 494 days.

(21) Appl. No.: 16/784,346

(22) Filed: Feb. 7, 2020

(65) Prior Publication Data
US 2021/0246795 A1    Aug. 12, 2021

(51) Int. Cl.
*F01D 5/18*    (2006.01)
*F01D 5/28*    (2006.01)

(52) U.S. Cl.
CPC ............ *F01D 5/183* (2013.01); *F01D 5/284* (2013.01); *F01D 5/288* (2013.01); *F05D 2230/90* (2013.01); *F05D 2260/203* (2013.01); *F05D 2300/6033* (2013.01)

(58) Field of Classification Search
CPC .......... F01D 5/282; F01D 5/284; F01D 5/288; F05D 2260/203
See application file for complete search history.

(56) References Cited

U.S. PATENT DOCUMENTS

| | | | | |
|---|---|---|---|---|
| 3,550,372 A * | 12/1970 | Morton | ...................... | F01D 5/18 416/198 A |
| 4,180,373 A * | 12/1979 | Moore | ..................... | F01D 5/187 415/115 |
| 8,980,435 B2 * | 3/2015 | de Diego | ................ | F01D 5/284 416/241 B |
| 9,739,157 B2 | 8/2017 | Uskert et al. | | |
| 9,896,943 B2 * | 2/2018 | Crosatti | ................... | F01D 5/189 |
| 10,267,165 B2 | 4/2019 | Zafiris et al. | | |
| 2013/0094971 A1 * | 4/2013 | Lacy | ....................... | F01D 5/183 416/97 R |
| 2014/0321994 A1 * | 10/2014 | Brzek | ..................... | F01D 25/12 415/175 |
| 2015/0322800 A1 | 11/2015 | Crosatti et al. | | |
| 2017/0113976 A1 * | 4/2017 | Shim | ....................... | C04B 41/91 |

(Continued)

FOREIGN PATENT DOCUMENTS

| EP | 1475567 | 11/2004 |
|---|---|---|
| EP | 2599959 | 6/2013 |

(Continued)

OTHER PUBLICATIONS

Partial European Search Report for European Patent Application No. 21155786.3 completed Sep. 15, 2021.

*Primary Examiner* — Christopher R Legendre
(74) *Attorney, Agent, or Firm* — Carlson, Gaskey & Olds, P.C.

(57) ABSTRACT

A gas turbine engine component includes a ceramic matrix composite (CMC) body that includes an interior surface that defines a blind cavity. A barrier coating is disposed on an exterior of the CMC body. A ceramic body in the blind cavity lines at least a portion of the interior surface of the CMC body. The ceramic body defines an open, interconnected network of pores.

13 Claims, 4 Drawing Sheets

(56) References Cited

U.S. PATENT DOCUMENTS

2017/0241272 A1\* 8/2017 Borto ............... B28B 1/001
2017/0283329 A1\* 10/2017 Xing ............. C04B 35/63416
2021/0246795 A1\* 8/2021 McCaffrey .......... F01D 5/282

FOREIGN PATENT DOCUMENTS

EP      3153666      4/2017
EP      3514328      7/2019
WO      2015057326   4/2015

\* cited by examiner

CMC COMPONENT WITH COOLING PROTECTION

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramics, such as ceramic matrix composite ("CMC") materials, are also being considered for airfoils. CMCs have high temperature resistance. Despite this attribute, there are unique challenges to implementing CMCs in airfoils.

SUMMARY

A gas turbine engine component according to an example of the present disclosure includes a ceramic matrix composite (CMC) body that has an interior surface that defines a blind cavity, a barrier coating disposed on an exterior of the CMC body, and a ceramic body in the blind cavity and that lines at least a portion of the interior surface of the CMC body. The ceramic body defines an open, interconnected network of pores.

In a further embodiment of any of the foregoing embodiments, the ceramic body has a porosity, by volume, of 15% to 70%.

In a further embodiment of any of the foregoing embodiments, the CMC body has a porosity, by volume, of 15% or less.

In a further embodiment of any of the foregoing embodiments, the porosity of the ceramic body is from 30% to 50%.

In a further embodiment of any of the foregoing embodiments, the ceramic body has carbon inclusions.

In a further embodiment of any of the foregoing embodiments, the ceramic body is within a forward-most 50% of the CMC airfoil body.

In a further embodiment of any of the foregoing embodiments, the CMC body includes a silicon carbide matrix and silicon carbide fibers, and the ceramic body is formed of silicon carbide.

In a further embodiment of any of the foregoing embodiments, the CMC body is an airfoil body that defines leading and trailing ends and first and second sides that join the leading and trailing ends.

An airfoil according to an example of the present disclosure includes an airfoil body that is formed of a silicon-containing ceramic material. The airfoil body defines leading and trailing ends and first and second sides that join the leading and trailing ends. The airfoil body includes an internal blind cavity, an environmental barrier coating disposed on an exterior of the airfoil body, a porous ceramic layer in the internal blind cavity, and a pressurized air source connected with the internal blind cavity to provide pressurized air thereto upon exposure of the porous ceramic layer at a localized region on the airfoil body due to loss of the environmental barrier coating and the silicon-containing ceramic material at the localized region. The porous ceramic layer permits through-flow of the pressurized air from the internal blind cavity to the localized region for film cooling.

In a further embodiment of any of the foregoing embodiments, the localized region is the leading end.

In a further embodiment of any of the foregoing embodiments, the ceramic body has a porosity, by volume, of 15% to 70%.

In a further embodiment of any of the foregoing embodiments, the CMC airfoil body has a porosity, by volume, of 15% or less.

In a further embodiment of any of the foregoing embodiments, the porosity of the ceramic body is from 30% to 50%.

In a further embodiment of any of the foregoing embodiments, the airfoil body includes a silicon carbide matrix and silicon carbide fibers, and the ceramic body is formed of silicon carbide.

In a further embodiment of any of the foregoing embodiments, the ceramic body is within a forward-most 50% of the CMC airfoil body.

A gas turbine engine according to an example of the present disclosure includes a compressor section, a combustor in fluid communication with the compressor section, and a turbine section in fluid communication with the combustor. The turbine section has an airfoil that includes a ceramic matrix composite (CMC) airfoil body that defines leading and trailing ends and first and second sides that join the leading and trailing ends. The CMC airfoil body has an interior surface that defines a radially-extending blind cavity, a barrier coating disposed on an exterior of the CMC airfoil body, and a ceramic body in the radially-extending blind cavity and that lines at least a portion of the interior surface of the CMC airfoil body. The ceramic body defines an open, interconnected network of pores.

In a further embodiment of any of the foregoing embodiments, the ceramic body has a porosity, by volume, of 15% to 70%.

In a further embodiment of any of the foregoing embodiments, the CMC airfoil body has a porosity, by volume, of 15% or less.

In a further embodiment of any of the foregoing embodiments, the porosity of the ceramic body is from 30% to 50%.

In a further embodiment of any of the foregoing embodiments, the ceramic body has carbon inclusions.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
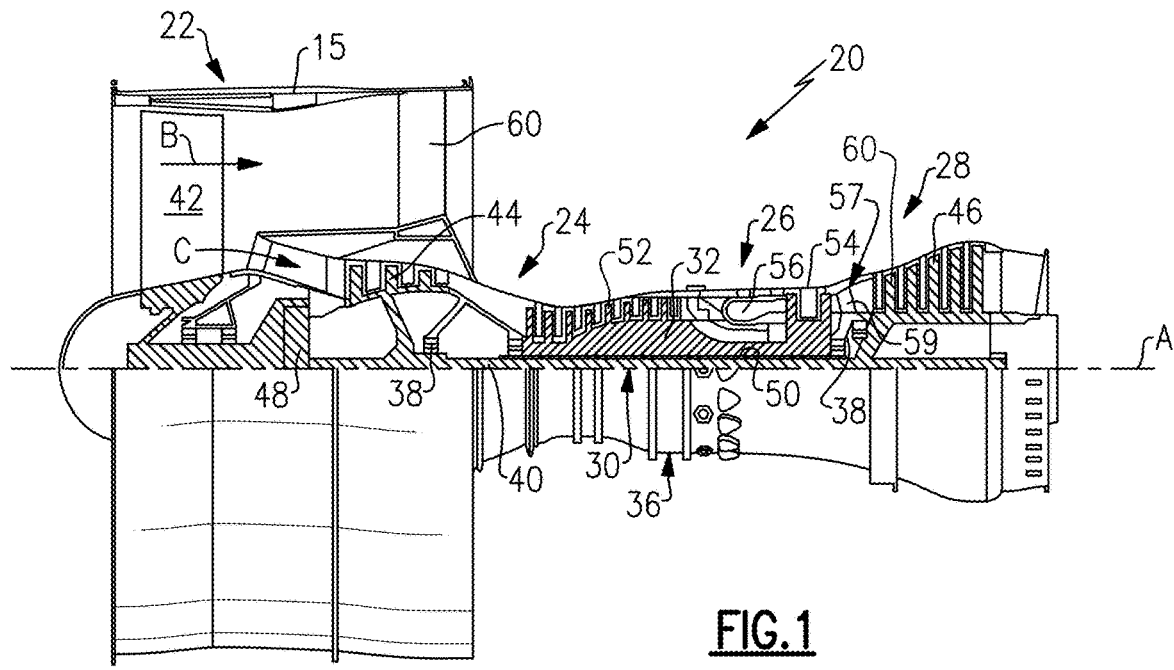
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
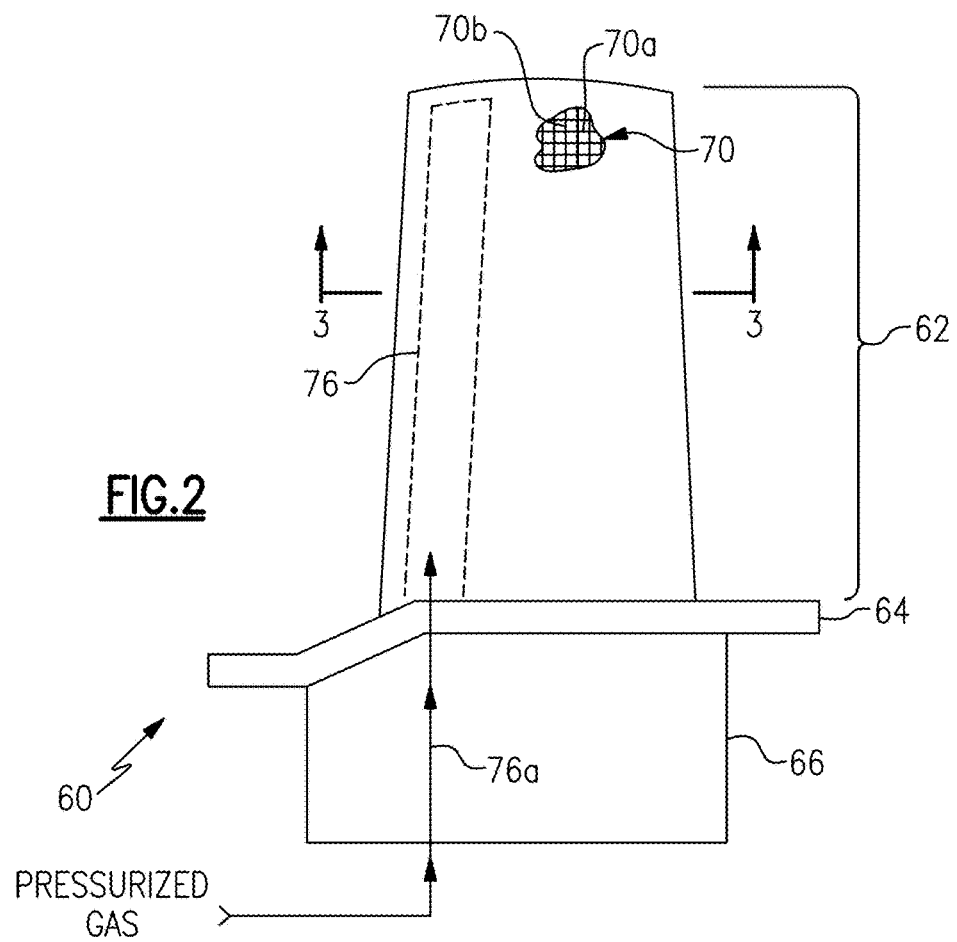
FIG. 2 illustrates an airfoil from the gas turbine engine.

FIG. 2 illustrates an example gas turbine engine component, which in this example is an airfoil 60 from the turbine section 28 of the engine 20. As shown, the airfoil 60 is a turbine blade, although it is to be understood that the examples herein are not limited and may be adapted to turbine vanes and other gas turbine engine components such as blade outer air seals, and combustor panels. In this example, the airfoil 60 includes an airfoil section 62, a platform 64, and a root 66 for attachment of the airfoil 60.

Figure 3:
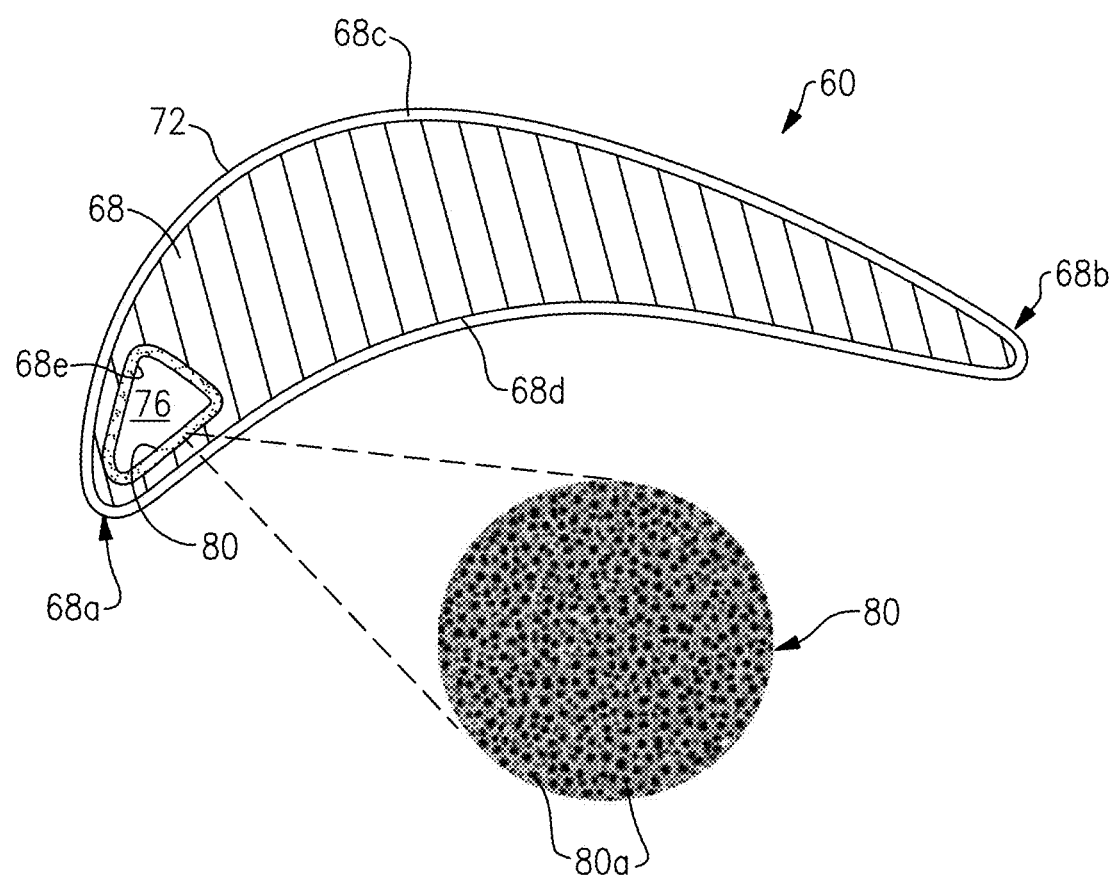
FIG. 3 illustrates a sectioned view of the airfoil of FIG. 2.

Referring also to the sectioned view of the airfoil 60 in FIG. 3, the airfoil 60 is formed of a body 68 that defines leading and trailing ends 68a/68b and first and second sides 68c/68d that join the leading and trailing ends 68a/68b. The leading and trailing ends 68a/68b and the first and second sides 68c/68d define the exterior, aerodynamic profile of the airfoil 60. For other types of gas turbine engine components, the body 68 will have a different shape that is adapted for the function of the component.

The body 68 is formed of a ceramic matrix composite (CMC), which is shown at 70 in a cutaway section in FIG. 2. The CMC 70 includes fibers 70a that are disposed in a ceramic matrix 70b. The ceramic matrix 70b is a silicon-containing ceramic, such as but not limited to, silicon carbide or silicon nitride. The fibers 70a are carbon fibers or ceramic fibers, such as but not limited to, silicon carbide fibers. In general, the CMC 70 is full or nearly fully densified. For example, the CMC 70 has a porosity, by volume, of 15% or less, or for blades 10% or less.

The airfoil 60 further includes a barrier coating 72. Most typically, to protect silicon-containing CMCs from recession, the barrier coating 72 is an environmental barrier coating, disposed on the exterior of the body 68, to resist infiltration or attack by the environment. The barrier coating 72 is not particularly limited and may be of mono-layer or multi-layer construction with one or more layers that include silica, rare earth monosilicate ($RESiO_5$), alkaline earth alumino-silicate ($AEAl_2Si_2O_8$), and combinations thereof.

The body 68 further includes an interior surface 74 that defines an internal blind cavity 76. In this example, the blind cavity 76 is radially-extending (radially elongated) through substantially the full radial span of the airfoil section 62. The remainder of the airfoil section 62 is solid in this example. The blind cavity 76 is connected via line 76a to receive pressurized air, such as compressor air. The airfoil 60, however, is "uncooled" in that the pressurized air is not fed through the blind cavity 76 for cooling or expelled through the airfoil section 62 into the core gas path for cooling. Rather, at least initially, there is no exit for pressurized air in the blind cavity 76 other than the entrance(s) by which the air enters the blind cavity 76.

The airfoil 60 further includes a porous ceramic body 80 in the blind cavity 76, the function of which will be discussed further below. As shown in the inset in FIG. 3, the ceramic body 80 defines an open, interconnected network of pores 80a. For example, the ceramic body 80 has a porosity, by volume, of 15% to 70%, or more narrowly from 30% to 50%.

In the illustrated example, the ceramic body 80 is a coating or layer of ceramic that lines the surface 74 in the blind cavity 76. For example, the ceramic that the body 80 is formed of is a silicon-containing ceramic, such as but not limited to, silicon carbide or silicon nitride. In a further example, the ceramic of the body 80 has the same composition as the matrix 70b of the CMC 70, such as silicon carbide or silicon nitride.

The barrier coating 72 is subject to spallation loss, particularly in the localized region of the leading end 68a, due to factors such as erosion, foreign substance infiltration (e.g., calcium-magnesium-aluminosilicate), or other factors. The barrier coating 72 in this example is utilized to combat recession of the silicon-containing ceramic of the CMC 70. Upon loss of the barrier coating 72, however, the underlying silicon-containing CMC 70 of the airfoil body 68 may become exposed in the core gas path of the engine 20 and thus subject to recession. In particular, high velocity, high pressure water vapor in the combustion gases can react with silicon, such as silicon in silicon carbide, to form volatile species that are then lost to the passing combustion gases (recession). If enough of the CMC 70 is lost in a localized region, the ceramic body 80 becomes exposed.

Figure 4A:
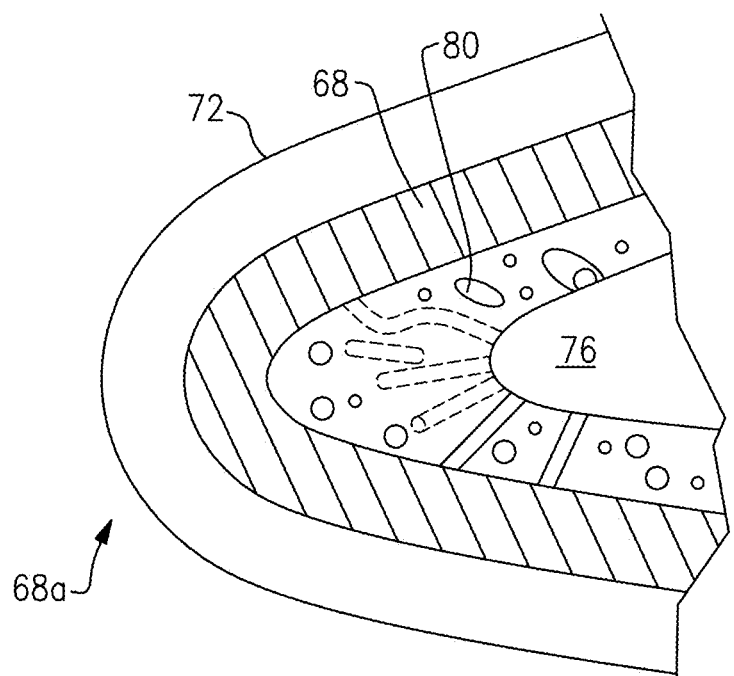
FIG. 4A illustrates the airfoil prior to any loss of the barrier coating.
Figure 4B:
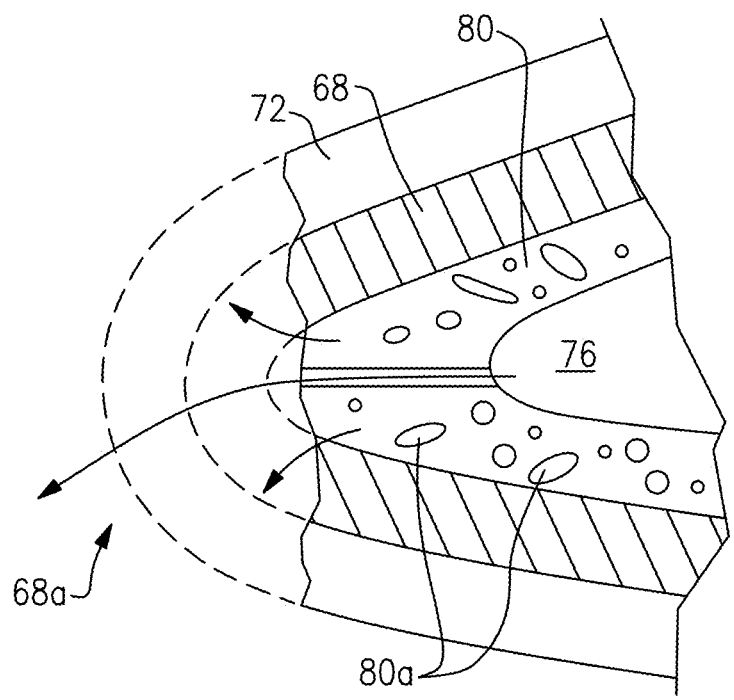
FIG. 4B illustrates the airfoil after loss of the barrier coating and airfoil body in a localized region, exposing an underlying porous ceramic.

The recession phenomenon is demonstrated pictorially in FIGS. 4A and 4B in which a localized region of the leading end 68a is shown. In FIG. 4A, the leading end 68a is shown in an initial state in which there has been no loss of the barrier coating 72. In FIG. 4B, the leading end 68a is shown after a period of use over which the barrier coating 72 has been lost, due to erosion or other factors, thereby exposing the underlying airfoil body 68 (which as described above is formed of the CMC 70). As further shown, the exposure of the body 68 in the core gas path has resulted in recession and loss of the body 68 in the localized region at the leading end 68a, thereby exposing the underlying ceramic body 80. The interconnected network of pores 80a of the ceramic body 80, with the prescribed porosity of 15% to 70%, permits flow-through of pressurized air from the blind cavity 76 to the localized region for film cooling. This cooling, in turn, facilitates lowering the recession rate of the ceramic body 80 in the localized region.

As will be appreciated, the blind cavity 76 in the illustrated example is located adjacent the localized region of interest at the leading end 68a. The blind cavity 76 is not otherwise necessary to the function of the airfoil 60, as an uncooled airfoil, or other gas turbine engine component. In this regard, the blind cavity 76 is located within a forward-most 50% of the body 68, relative to the chord-length of the body 68.

Figure 5:
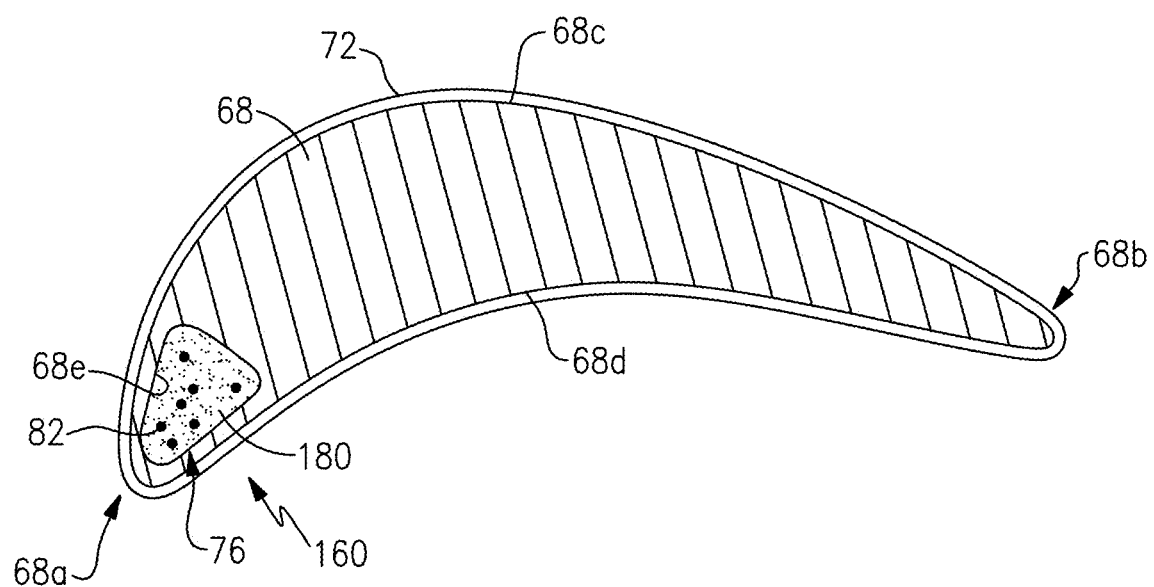
FIG. 5 illustrates another example in which the porous ceramic fills or substantially fills the cavity in the airfoil.

FIG. 5 illustrates a further example of a gas turbine engine component, which again is represented as an airfoil 160 but is understood to apply also to other gas turbine engine components. The airfoil 160 is the same as the airfoil 60 described above except for ceramic body 180. In this example, rather than being a layer or coating, the ceramic body 180 is a porous plug that fills or substantially fills the blind cavity 76. Thus, rather than the blind cavity 76 being hollow as in the example in FIG. 3, the blind cavity 76 in this example is loaded with the ceramic body 180 such that the pressurized air in the blind cavity 76 from the line 76a travels entirely or nearly entirely in the ceramic body 180.

The airfoil 160 also demonstrates a further example in which the ceramic body 180 includes carbon inclusions 82. The carbon inclusions 82 are carbon particles that are dispersed through the ceramic of the ceramic body 180. The carbon inclusions 82 serve as sacrificial pore-formers in that the carbon inclusions 82 volatilize to leave behind pores through which the pressurized air can flow. As an example, the carbon inclusions 82 may be pre-volatilized prior to implementation of the airfoil 160 in its intended end-use. Alternatively, the carbon inclusions 82 are maintained in the ceramic body 180 and, when exposed to the hot combustion gases upon loss of the barrier coating 72 and airfoil body 68, the carbon inclusions 82 volatilize. The volatilization of the carbon inclusions 82 opens paths, or additional paths, for flow-through of the pressurized air. As will be appreciated, the pores from the carbon inclusions 82 may be used in combination with pores that are formed during processing of the ceramic of the ceramic body 180 to form the interconnected pore network 80a described above. Alternatively, if the ceramic is dense, the pores from the carbon inclusions will make up substantially all of the interconnected pore network 80a. As will be further appreciated, in additional examples, the carbon inclusions 82 are included in the ceramic body 80.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. A gas turbine engine component comprising:
a ceramic matrix composite (CMC) body including an interior surface defining a blind cavity having only one opening;
a barrier coating disposed on an exterior of the CMC body; and
a ceramic body in the blind cavity and lining at least a portion of the interior surface of the CMC body, the ceramic body defining an open, interconnected network of pores.

2. The gas turbine engine component as recited in claim 1, wherein the ceramic body has a porosity, by volume, of 15% to 70%.

3. The gas turbine engine component as recited in claim 2, wherein the CMC body has a porosity, by volume, of 15% or less.

4. The gas turbine engine component as recited in claim 3, wherein the porosity of the ceramic body is from 30% to 50%.

5. The gas turbine engine component as recited in claim 1, wherein the ceramic body has carbon inclusions.

6. The gas turbine engine component as recited in claim 1, wherein the ceramic body is within a forward-most 50% of the CMC body.

7. The gas turbine engine component as recited in claim 1, wherein the CMC body includes a silicon carbide matrix and silicon carbide fibers, and the ceramic body is formed of silicon carbide.

8. The gas turbine engine component as recited in claim 1, wherein the CMC body is an airfoil body that defines leading and trailing ends and first and second sides that join the leading and trailing ends.

9. A gas turbine engine comprising:
a compressor section;
a combustor in fluid communication with the compressor section; and
a turbine section in fluid communication with the combustor,
the turbine section having an airfoil that includes
a ceramic matrix composite (CMC) airfoil body defining leading and trailing ends and first and second sides that join the leading and trailing ends, the CMC airfoil body including an interior surface defining a radially-extending blind cavity having only one opening,
a barrier coating disposed on an exterior of the CMC airfoil body, and
a ceramic body in the radially-extending blind cavity and lining at least a portion of the interior surface of the CMC airfoil body, the ceramic body defining an open, interconnected network of pores.

10. The engine as recited in claim 9, wherein the ceramic body has a porosity, by volume, of 15% to 70%.

11. The engine as recited in claim 10, wherein the CMC airfoil body has a porosity, by volume, of 15% or less.

12. The engine as recited in claim 11, wherein the porosity of the ceramic body is from 30% to 50%.

13. The engine as recited in claim 9, wherein the ceramic body has carbon inclusions.

* * * * *